UNITED STATES PATENT OFFICE.

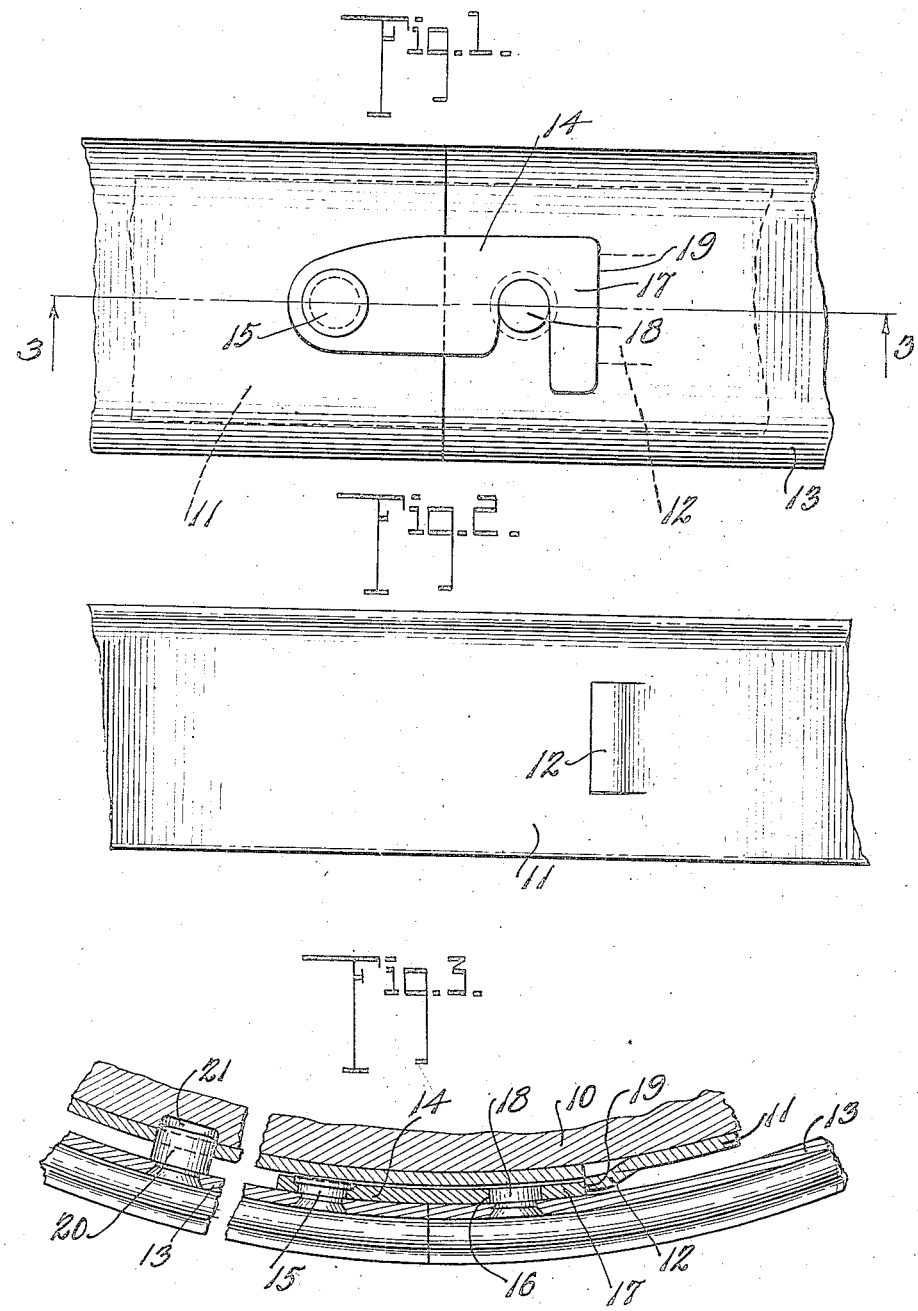

LOUIS H. PERLMAN, OF NEW YORK, N. Y.

WHEEL.

1,374,103.

Specification of Letters Patent.

Patented Apr. 5, 1921.

Application filed February 23, 1917. Serial No. 150,488.

*To all whom it may concern:*

Be it known that I, LOUIS H. PERLMAN, a citizen of the United States, residing at New York city, in the county of New York and State of New York, have invented certain new and useful Improvements in Wheels; and I do hereby declare the following to be a full, clear, and exact description of the invention, such as will enable others skilled in the art to which it appertains to make and use the same.

The present invention relates to wheels, particularly of the carrier type for automobiles, and the like, and refers particularly to the driver and cross-cut end connections for demountable rims adapted to be carried upon the wheel bodies.

An object is to provide a locking means for demountable rims of the cross-cut type which may be permanently carried by the rim to secure the free ends thereof together; and to provide the wheel body with retaining means adapted to engage the locking means when the rim is in place on the wheel body, to hold and brace the locking means in securing position.

A further object is to provide an improved form of driver for holding the demountable rim from turning on the wheel body.

The above, and various other novel features of this invention, will be in part described and in part understood from the following detailed description of the present preferred embodiment, the same being illustrated in the accompanying drawing, wherein:

Figure 1 is a fragmentary inner face view of a cross-cut rim, showing the meeting ends thereof and a locking means for the ends constructed according to the present invention, the dotted lines indicating the adjacent portion of the wheel body constructed according to the present invention.

Fig. 2 is a fragmentary peripheral face view of the felly band or fixed rim of a wheel body, constructed according to the present invention.

Fig. 3 is a fragmentary section taken circumferentially through the peripheral portion of a wheel body on the line 3—3 of Fig. 1, showing the fixed and demountable rims with the locking means and the driver of this invention applied thereto.

Referring to this drawing, 10 designates a felly, and 11 a felly band or fixed rim of a wheel body. The felly band 11 is provided at a suitable point in its peripheral surface with a retaining lip 12, which may be cut or stamped from the body of the rim 11 and pressed outwardly in substantially offset relation from the body of the rim. The lip 12 may be relatively broad, transversely of the rim 11, as shown, and provides a relatively broad abutting free edge.

A rim 13 of the demountable cross-cut type is adapted to be mounted on the wheel body in the usual manner, and has its meeting ends secured in abutting relation by means of a hook 14. The hook 14 may be in the form of a relatively flat plate slightly reduced in width and rounded at one end, and pivotally connected thereat, by means of a rivet 15, against the inner side of the rim 13, adjacent to one of the free ends of the rim. The opposite or free end of the hook 14 is formed with a transversely extending recess 16 which opens through one edge of the hook to provide a throat therefor, and a bill 17 on the outer end of the hook.

The free end of the hook may be swung to project beyond said end of the rim and the throat 16 of the hook is adapted to receive therein a stud or projection 18, in the form of a rivet, projecting from the inner side of the opposite end of the rim 13. The bill 17 is elongated, as compared with the width of the outer end of the hook 14, and is formed with a relatively straight edge 19 adapted to lie against the abutting edge of the lip 12, when the rim is mounted on the wheel body.

The demountable rim 13 is provided near one end and on its inner face, in spaced relation to the pivot 15, with a driver 20 in the form of a stud which may be riveted to the rim 13, and which projects from the rim sufficiently to seat in a recess or pocket 21 formed in the peripheral surface of the wheel body. As shown in Fig. 3, the recess 21 extends through the felly band 11 and into the felly 10. The driver 20 is adapted to engage in the recess 21 when the demountable rim 13 is secured in position upon the wheel body.

In operation, the meeting ends of the cross-cut demountable rim 13 are secured together, before applying the rim to the wheel body, by swinging the hook 14 to engage the projection 18 in the throat 16 of the hook. The rim 13 is now applied to the wheel body with the driver 20 in registry with the recess 21, and with the bill 17 of the hook arranged opposite to the abutting edge of the lip 12. When the rim 13 is tightened upon the wheel body by any of the well known means, not shown, the driver 20 is seated in the recess 21 and the straight edge 19 of the hook is moved into contact with the straight edge of the locking lip 12. The lip 12 holds the hook from swinging laterally out of engagement with the stud or projection 18 and the elongation of the bill 17 insures this result. The lip 12 also holds the bill of the hook from distortion or spreading from the body of the hook when the demountable rim 13 is submitted to an expansive force. The lip 12 further serves in the capacity of a driver auxiliary to the driver 20 to hold the demountable rim from turning upon the wheel body. The driver 20 and the recess 21 are so located respectively on the rim 13 and in the wheel body that they determine the positioning of and hold the hook 14 against the retaining lips 12.

It is apparent that various changes in detail may be made in the above described structure within the scope of the following claims without departing from the spirit of this invention.

What I claim is:—

1. The combination of a wheel body having a felly band provided with a peripheral projection, a cross-cut demountable rim for the wheel body, and a hook pivotally connected to one end of the rim and engaging the opposite end thereof to hold the ends together, said projection of the wheel body being adapted to engage the bill of the hook to hold the same from spreading and to retain the hook in interlocking position.

2. The combination of a wheel body having a felly band provided with a projection in its periphery, a cross-cut rim for the wheel body, and a locking member movably engaging the ends of the rim to hold the same together, said projection of the felly band being adapted for engagement with the locking member to hold the same from spreading and to retain the member in locking position.

3. The combination of a wheel body including a felly band having an outwardly pressed lip on its peripheral surface, a cross-cut demountable rim for the wheel body provided with an inwardly extending stud on one end, and a hook pivotally mounted on the opposite end of said rim for interlocking engagement with said stud to hold the rim ends together, said lip being adapted to engage said hook to hold it in locking engagement with the stud when the rim is mounted on the wheel body.

4. The combination of a wheel body provided with a peripheral recess and a raised lip in its periphery spaced circumferentially from the recess, a demountable rim for the wheel body, a locking member movably mounted on the inner face of the rim and adapted for interlocking engagement with the opposite end thereof, and a driver projecting from the inner face of the rim in spaced relation to the locking member for engagement in said peripheral recess of the wheel body to hold said locking member against said projection of the wheel body for retaining the locking member in position.

5. The combination of a wheel body provided with a recess and an outwardly extending lip in its periphery, a demountable rim for the wheel body, a hook pivotally mounted on one end of the rim and adapted for interlocking engagement with the opposite end thereof, and a driver mounted on the inner face of said rim for engagement in said peripheral recess of the wheel body to hold the rim from turning on the wheel body, and said lip of the wheel body being adapted to engage said hook to hold the same in interlocking position.

6. The combination with a cross-cut demountable rim for wheel bodies, of a flat hook pivoted upon the inner face of said rim at one end thereof and having a transversely extending throat opening through one edge of the hook, and a stud projecting inwardly from the opposite end of said rim for engagement in said throat of the hook by a transverse swinging movement of the latter to lock the ends of the rim together, a portion of the hook at one side of the throat extending beyond the line of the edge of the body portion of the hook.

7. The combination of a wheel body having a projection thereon, a cross-cut demountable rim for the wheel body, a hook pivotally mounted on one end of said rim and adapted for interlocking engagement with the opposite end thereof, and means associated with said hook for interlocking the rim and the wheel body to hold the rim from turning on the latter and for holding said hook immovably against said projection.

8. The combination of a wheel body provided with a felly band having a retaining lip stamped outwardly from the body thereof, a cross-cut demountable rim for the wheel body, a hook pivoted with a transversely extending throat opening through one side of the hook and having a transversely elongated bill with an outer flat edge, and a stud projecting from the inner face of said rim at the opposite end thereof for engagement in the throat of said hook, said straight edge of the bill of the hook being adapted for engagement against said lip of the wheel body to hold the hook from swinging free from the stud and to hold the bill from spreading from the body of the hook.

In testimony whereof I affix my signature in presence of two witnesses.

LOUIS H. PERLMAN.

Witnesses:
  I. B. LEIBSON,
  EDGAR M. KITCHIN.